US012613754B2

(12) United States Patent
Lybecker et al.

(10) Patent No.: US 12,613,754 B2
(45) Date of Patent: Apr. 28, 2026

(54) DATABASE MANAGEMENT METHODS AND ASSOCIATED APPARATUS

(71) Applicant: BOOMI, LP, Conshohocken, PA (US)

(72) Inventors: Dennis Lybecker, Søborg (DK); Peter Kreiner-Sasady, Søborg (DK); Ralph Nedergaard, Søborg (DK)

(73) Assignee: Boomi, LP, Conshohocken, PA (US)

( * ) Notice: Subject to any disclaimer, the term of this patent is extended or adjusted under 35 U.S.C. 154(b) by 629 days.

(21) Appl. No.: 18/105,297

(22) Filed: Feb. 3, 2023

(65) Prior Publication Data

US 2023/0251916 A1      Aug. 10, 2023

(30) Foreign Application Priority Data

Feb. 4, 2022     (DK) ........................... PA 2022 70050

(51) Int. Cl.
  *G06F 9/54* (2006.01)
  *G06F 16/248* (2019.01)
  *H04L 67/02* (2022.01)
(52) U.S. Cl.
  CPC ............ *G06F 9/542* (2013.01); *G06F 16/248* (2019.01); *H04L 67/02* (2013.01)
(58) Field of Classification Search
  None
  See application file for complete search history.

(56) References Cited

U.S. PATENT DOCUMENTS

| | | |
|---|---|---|
| 9,201,558 B1 | 12/2015 | Dingman et al. |
| 11,604,794 B1 * | 3/2023 | Nallapati .......... G06F 16/24522 |

| | | | |
|---|---|---|---|
| 2014/0195476 A1 | 7/2014 | Sxhmidt | |
| 2015/0347539 A1 * | 12/2015 | Holmes ................. G06F 16/254 707/602 |
| 2016/0182652 A1 * | 6/2016 | Bevilacqua ............. G06F 9/546 709/203 |
| 2016/0283203 A1 | 9/2016 | Li et al. | |

(Continued)

FOREIGN PATENT DOCUMENTS

| | | |
|---|---|---|
| WO | 2021168640 A1 | 9/2021 |
| WO | 2021234019 A1 | 11/2021 |

OTHER PUBLICATIONS

J. H. Betzing, "Design and Development of an Event-driven In-memory Business Process Engine," 2017 IEEE 19th Conference on Business Informatics (CBI), Thessaloniki, Greece, 2017, pp. 23-32. (Year: 2017).*

(Continued)

*Primary Examiner* — Frank D Mills
(74) *Attorney, Agent, or Firm* — Procopio, Cory, Hargreaves & Savitch LLP

(57)       ABSTRACT

A computer-implemented method for calling a REST web-service for interacting with a database that stores database information, the method comprising: presenting to a user a list of pre-existing events, wherein each of the pre-existing events provides a trigger in response to activity in the database; receiving a user selection of one of the presented pre-existing events; receiving a user selection of one or more actions to be taken in response to the selected pre-existing event providing a trigger; and when the selected pre-existing event happens, calling a REST webservice by sending data to a receiver based on the selected pre-existing event and the one or more selected actions.

11 Claims, 7 Drawing Sheets

(56)         References Cited

U.S. PATENT DOCUMENTS

2018/0081645 A1     3/2018  Alurralde Iturri et al.
2020/0092178 A1     3/2020  Nelson et al.
2023/0099475 A1*    3/2023  Bhargava .............. G06F 16/245
                                                            707/770
2023/0185640 A1*    6/2023  Zhang .................... G06F 9/542
                                                            719/318
2023/0195792 A1*    6/2023  Petersen .............. G06F 16/907
                                                            707/609

OTHER PUBLICATIONS

First Technical Examination Report mailed Aug. 5, 2022 for Danish patent application No. PA 2022 70050.
Official Action mailed Feb. 27, 2025 for European Application No. 23154313.3, 11 pages.
Citation Bot et al: "Database trigger", Wikipedia, Nov. 16, 2021 (Nov. 16, 2021), pp. 1-6, XP093253149, Retrieved from the Internet: URL:https://en.wikipedia.org/w/index.php?title=Database_trigger&oldid= 1055502683.

* cited by examiner

DATABASE MANAGEMENT METHODS AND ASSOCIATED APPARATUS

BACKGROUND

The present disclosure relates to apparatus, systems and methods for managing access to data stored in a database and, in particular, although not necessarily, to enabling reading and writing of database information as well as executing relevant business logic.

SUMMARY

According to a first aspect of the invention, there is provided a computer-implemented method for calling a (constant activated) REST webservice for interacting with a database that stores database information, the method comprising:

presenting to a user a list of pre-existing events, wherein each of the pre-existing events provides a trigger in response to activity in the database;

receiving a user selection of one of the presented pre-existing events;

receiving a user selection of one or more actions to be taken in response to the selected pre-existing event providing a trigger; and when the selected pre-existing event happens, calling a REST webservice by sending data to a receiver based on the selected pre-existing event and the one or more selected actions.

Advantageously, such a method can enable a person that is not necessarily a technical expert in database coding to call one or more REST webservices. Furthermore, use of the pre-existing events can advantageously provide a computationally convenient and efficient mechanism for allowing a user to call a REST webservice that can interact with both standard and non-standard tables and views.

The list of pre-existing events may comprise business events and/or change pointers.

The method may comprise:

calling the REST webservice by generating and storing configuration data in memory such that the configuration data is available for configuring a framework REST webservice when it is called.

Each of the pre-existing events may automatically provide the trigger as a PUSH event.

Receiving a user selection of one or more actions to be taken may comprise receiving a user selection of a table service.

The step of presenting to the user the list of the pre-existing events may be in response to a user-initiated search for pre-existing events based on one or more of: an identifier of the pre-existing event; a name of the pre-existing event; and a textual description of the pre-existing event.

The method may further comprise:

presenting to a user a list of pre-existing business objects, wherein each of the pre-existing business objects is associated with one or more fields or tables in the database; and receiving a user selection of a presented pre-existing business object, and in response presenting to the user a list of pre-existing business events that are associated with the selected pre-existing object such that the user can select one of the pre-existing business events as the selected pre-existing event.

The method may further comprise:

presenting to the user a list of actions, and in response:

receiving the user selection of the one or more actions that can be taken in response to one or more of the selected pre-existing events providing a trigger.

The REST webservice may be configured to:

read the database information via an application layer in communication with the database and provide the database information as an open format message; and/or through the use of function modules write the database information to the database.

The method may further comprise:

querying a data model, wherein the data model comprises a list of function modules associated with the database, wherein each of the function modules are for interacting with database information in one or more fields of the database;

returning, in response to the querying, identifiers of a plurality of function modules;

presenting to the user a list of the returned function modules;

receiving a user selection of one or more of the presented function modules; and calling the REST webservice also based on the selected one or more function modules.

The step of presenting to the user the list of the returned function modules may be in response to a user-initiated search for function modules based on one or more of: an identifier of the function module; a name of the function module; and a textual description of the function module.

The data model may be independent of the database information.

The user selection of the function module may be generated by an iterative process of interaction between the user and the data model.

The database may be part of an Enterprise Resource Planning database system, such as an SAP system.

There is also disclosed a computer-readable memory medium comprising code configured to perform any method disclosed herein.

According to a further aspect of the present disclosure, there is provided a processor for calling a REST webservice for interacting with a database that stores database information, the processor configured to:

present to a user a list of pre-existing events, wherein each of the pre-existing events provides a trigger in response to activity in the database;

receive a user selection of one of the presented pre-existing events;

receive a user selection of one or more actions to be taken in response to the selected pre-existing event providing a trigger; and when the selected pre-existing event happens, call a REST webservice by sending data to a receiver based on the selected pre-existing event and the one or more selected actions.

There is also disclosed, a computer-implemented method for calling a REST webservice for interacting with a database that stores database information, the method comprising:

receiving user selection of a REST webservice;

identifying configuration data that is associated with the selected REST webservice in memory; and configuring a framework REST webservice with the identified configuration data in order to provide the functionality of the selected REST webservice.

There is also disclosed, a processor for calling a REST webservice for interacting with a database that stores database information, the processor configured to:

receive user selection of a REST webservice;

identify configuration data that is associated with the selected REST webservice in memory; and configure a framework REST webservice with the identified configuration data in order to provide the functionality of the selected REST webservice.

There may be provided a computer program, which when run on a computer, causes the computer to configure any apparatus disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF DRAWINGS

One or more embodiments will now be described by way of example only with reference to the accompanying drawings in which.

DETAILED DESCRIPTION

A database may contain a vast amount of information which may be organised into hundreds of thousands, or millions, of different tables. For a user to access particular information in a database may therefore require complex computer coding tasks to be performed to produce scripts that are necessary for extracting the required information. This may render it difficult or impossible for many users to access the information in an efficient and timely way. Alternatively, a specialist developer may be required to write a bespoke script. Even then, the preparation of the necessary script can be extremely time consuming for the specialist developer. Therefore, there exists a need for improved methods for enabling users to access information in complex databases without requiring sophisticated and bespoke computer coding for every possible combination of data that a user may desire to access.

In the present disclosure, the term 'database information' is used to refer to any data, information, or content that can be stored in a database. This terminology does not imply any limitation to the cognitive content of the database information. The present disclosure relates to improved ways of providing access to such database information. Here, providing access can refer to calling or generating one or more REST (REpresentation State Transfer) webservices for: (i) reading database information from a database; and/or (ii) writing database information to a database. In some examples, this can be considered as controlling database information.

Figure 1:
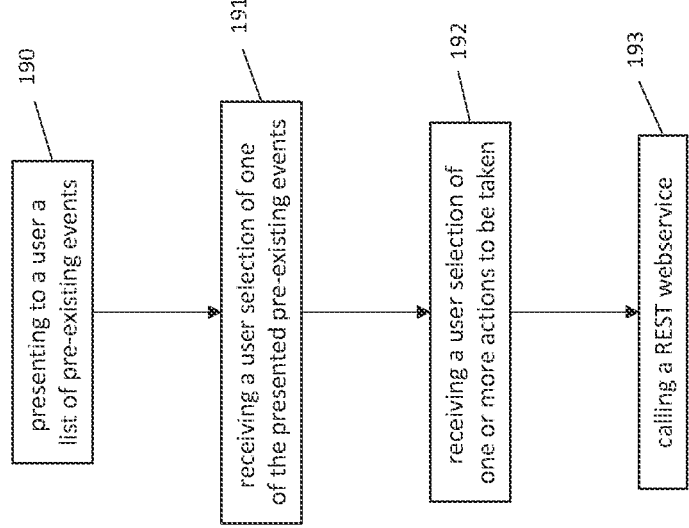
FIG. 1 shows schematically a computer-implemented method for calling a REST (REpresentation State Transfer) webservice, wherein the REST webservice is for interacting with a database system that stores database information.

FIG. 1 shows schematically a computer-implemented method for calling a REST (REpresentation State Transfer) webservice, wherein the REST webservice is for interacting with a database system that stores database information. The REST webservice that is to be called may already be activated. For example, it may be constantly activated. The database system may be part of an Enterprise Resource Planning (ERP) database system. Examples of database systems that may be used are provided by SAP (RTM), Oracle (RTM) and other vendors. Examples disclosed herein can be particularly beneficial for ERP database systems that have the ability to expose REST OpenAPI services, but don't have a built-in framework to automatically generate services themselves. Although it will be appreciated that the nature of the content of the database is not important to the teachings of the present disclosure; instead it is the mechanism of providing access to the database information in the database that has been improved.

At step 190, the method involves presenting to a user a list of pre-existing events. Each of the pre-existing events provides a trigger in response to activity in the database. Examples of such events include business events and change pointers (which are known for a SAP database system, for example), as will be discussed in detail below. As non-limiting examples, the trigger can be generated in response to one or more of the following: the creation of database information, database information being read, database information being updated, database information being deleted, any change in a table or field, the absence of any of the above in a predetermined period of time (i.e. a negative event such as a field not being accessed) or any combination thereof cascaded together. Such events can be standard or customised events. For example, an SAP database system has a large number of standard business events and change pointers that can be presented to the user.

At step 191, the method involves receiving a user selection of one of the presented pre-existing events. In one example, at step 190 the method presents the list of pre-existing events as a drop down list and/or in response to a user inputting text into a search box. Then, at step 191 the user selects the required pre-existing event from the drop down list or by using the search box.

At step 192, the method includes receiving a user selec-
tion of one or more actions to be taken in response to one or
more of the selected pre-existing events providing a trigger.
In a SAP database system this can be considered as selecting
a table service, for example. In some examples, the user
selection of the one or more actions can be in response to the
method presenting to the user a list of available actions. For
instance, a user can search for an action by typing a name or
part of a description into a search box, and then the method
can present a list of actions that satisfy the search for the user
to select at step 192. The method can include retrieving a list
of available actions from computer memory for presenting
to the user.

At step 193, the method involves calling a REST web-
service based on the one or more selected pre-existing
events and the one or more selected actions. Further details
of an example of how the method can call the REST
webservice are provided below. In some examples, the
method can call the REST webservice by generating and
storing configuration data in memory such that the configu-
ration data is available for configuring the REST webservice
when it is called. As will be appreciated from the discussion
that follows, such generation and storage of configuration
data can be considered to be logically equivalent to generating a REST webservice.

Presenting the list of pre-existing events, and enabling
one of the pre-existing events and the one or more actions to
be selected in this way is a hugely significant improvement
over current ways in which a user can call/generate a REST
webservice. This is because, as set out above, existing
methodologies require a specialist developer to perform
complex computer coding tasks to produce scripts that are
necessary for extracting the required information. The
preparation of the necessary script can be extremely time
consuming for the specialist developer. In one example, the
time taken to call/generate a REST webservice according to
an embodiment of the present invention can be less than 1
minute or of the order of 5 minutes, whereas previously it
would take a week or two. There is a prejudice in the art of
database systems, especially SAP database systems, against
providing user interfaces that are associated with the func-
tionality of FIG. 1. Instead, there is a long-held belief in this
technical field that REST webservices must be generated by
a specialist developer.

Figure 2:
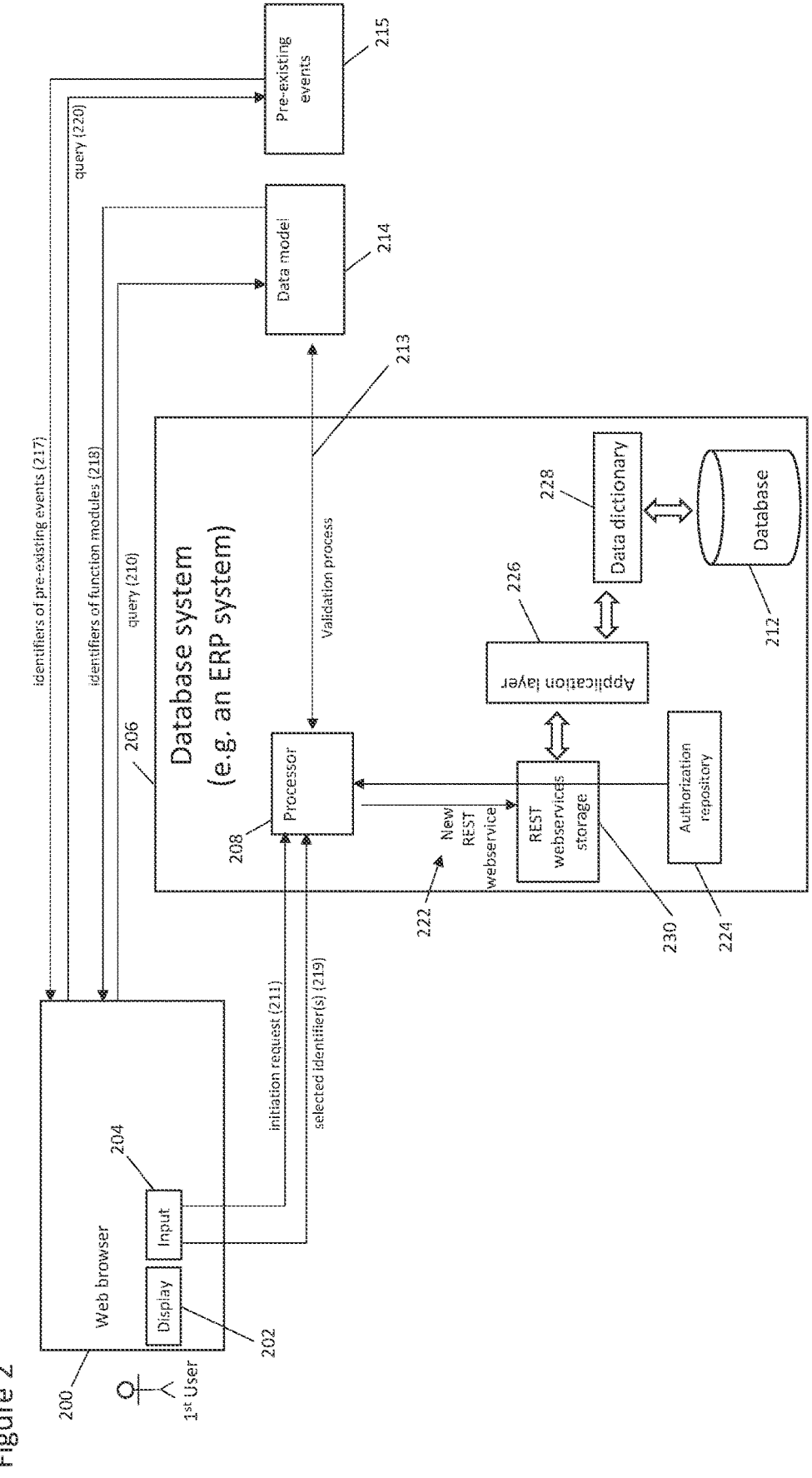
FIG. 2 shows a computer system for generating configuration data for a REST webservice for interacting with a database.

FIG. 2 shows a computer system for calling a REST
webservice for interacting with a database 212, such as by
enabling access to database information that is stored in the
database 212, which is part of a database system 206. In this
example, the system calls the REST webservice by generating and storing configuration data that can be subsequently
accessed by a "framework" REST webservice when the
REST webservice is called.

In FIG. 2, a first user can use a web browser 200 to
interact with a webpage that has: (i) a display 202; and (ii)
input functionality 204 so that the user can provide input that
is representative of database information that he or she
wishes to access/interact with. As will be discussed in detail
below, advantageously the system of FIG. 2 can enable a
person that is not necessarily a technical expert in database
coding to use the web browser 200 to call/generate one or
more REST webservices. As is known in the art, use of a
REST webservice ensures that data is communicated in an
open format It will be appreciated that in other examples a bespoke
application, or any other interface, can be used by the first
user to interact with the database system 206.

As shown in FIG. 2, the database system 206 is opera-
tively coupled to the web browser 200, for example via the
internet. The database system 206 has a processor 208,
which can be referred to as a service generator.

FIG. 2 also includes a repository 215 of pre-existing
events and a data model 214. The repository of pre-existing
events 215 and the data model 214 are stored in computer
memory that can be part of the database system 206, part of
the first-user's machine through which they are accessing
the web browser 200, or can be remote from the first user
and the database system 206.

The repository 215 of pre-existing events can store at least
identifiers for the pre-existing events. In some examples, the
repository 215 can also include the name and/or a descrip-
tion of the pre-existing events such that they can conve-
niently be found by the first user performing a search. The
web browser 200 can receive at least the identifiers 217 of
the pre-existing events from the repository 215 (and option-
ally also the name and/or description of the pre-existing
events) in response to an associated query 220, such that
they can be presented to the first user on the display 202 of
the web browser 200. In this way, the web browser 200 can
present to the user the list of pre-existing events in response
to a user-initiated search for pre-existing events based on
one or more of: an identifier of the pre-existing event; a
name of the pre-existing event; and a textual description of
the pre-existing event.

The first user can then select one of the pre-existing events
for including in a REST webservice 222 and can also select
one or more actions to be taken using the input functionality
204 of the web browser 200, as discussed above with
reference to FIG. 1. In this example, once the user has made
their final selection of the identifiers that they wish to be
included in the new REST webservice 222, they click a
"generate" button. The web browser 200 then sends an
initiation request 211 and the identifiers 219 of the selected
pre-existing event and of the selected one or more actions to
the database system 206.

The data model 214 comprises a list of function modules
associated with the database 212. Each of the function
modules are for interacting with database information in one
or more fields of the database as well as for executing any
function module logic. The data model 214 does not need to
contain the database information, or any of the content of the
database 212; indeed, the data model 114 can be said to be
independent of the database information or content. This is
because changes to the database information or content do
not necessarily result in any changes to the data model 114.
That is, the data model 114 may not include any of, or all of,
the database information that is stored in the database 112.
The function modules can be considered as pathfinders to
specific fields in the database 212, such that they are
indirectly representative of the structure of the database 212
that ultimately stores the desired database information. Such
function modules are known in SAP, for example, and can
be considered as modules of code that interact with one or
more fields in the database 212. In SAP, the function
modules have function module names as identifiers. Advan-
tageously, if there are any updates to the fields/tables in the
database 212, then the function modules can be updated
correspondingly without changing the identifier of the func-
tion module. Therefore, the data model 214 does not become
out-of-date when the underlying database 212 is updated.

The web browser 200 can query 210 the data model 214.
In response to the querying, identifiers 218 of a plurality of
function modules are returned to the web browser 200. The
query 210 can be sent to the data model 214 at start-up, in which case identifiers 218 for all of the available function modules may be returned to the web browser 200. Alternatively or additionally, a query 210 can be sent from the web browser to the data model 214 in response to the first user performing a search for a function module. In which case, the data model 214 may return the identifiers 218 for the function modules that satisfy the search. In this way, the web browser 200 can present to the first user the list of the returned function modules in response to a user-initiated search for function modules based on one or more of: an identifier of the function module (such as a function module transaction code); a name of the function module; and a textual description of the function module.

Then, the display 202 of the web browser 200 can present to the user a list of the returned function modules (i.e. those associated with the identifiers 218 that are returned in response to the query 210). The display 202 can present one or more of the following for each function module in the list: the identifier of the function module (such as a function module transaction code); the name of the function module; and a description of the functionality of the function module.

The first user can then select one or more of the presented function modules for inclusion in the desired REST webservice 222. Once the first user is ready to call the REST webservice 222, they provide input to the web browser 200 by clicking a "generate" button. The web browser 200 then sends an initiation request 211 and the identifier 219 of the selected function modules to the database system 206.

The processor 208 receives the initiation request 211 from the web browser 200, where the initiation request 211 represents an indication from the first user that they intend to call a REST webservice 222 for interacting with the database information. The processor 208 also receives one or both of: i) the identifiers 219 of the selected pre-existing event and of the selected one or more actions; and ii) the identifiers 219 of the selected one or more function modules. As discussed below, the processor then generates and stores configuration data for the new REST webservice 222 based on the received information.

In this example, the content of the data model 214 is validated such that only valid identifiers of function modules can be subsequently presented to the user on the display 202 of the web browser 200. The validation can be performed at start-up or in response to the initiation request 211. The identifiers of the function modules may specify one or more particular tables of the database 212 that contain the desired database information. In some examples, the identifiers may additionally specify particular locations within tables, such as particular fields, where the desired information is stored.

For instance, when the first user starts a session for calling a REST webservice 222, they may provide a command for activating the data model 214. In response to receiving this command, the processor 208 checks the validity of the function modules that are stored in the data model 214, which is shown schematically in FIG. 2 with data exchange 213. This can be performed by checking the validity of the identifiers that are included in the data model 214 against the structure of the database 212 using a data dictionary 228.

If there is any invalid information in the data model 214, then the application layer 226 can take remedial action in relation to what is presented to the user on the display 202. For instance, an invalid identifier may be presented to the user, but identified with an error message to inform the user that the identifier is invalid. The invalid identifier may also be presented in such a way that it cannot be selected by a user, and therefore cannot be represented by a subsequent initiation request 211. It is advantageous to prevent such an invalid initiation request 211 because (as will be appreciated from the following description) sending an invalid initiation request 211 to the processor 211 could result in an invalid REST webservice being called, which would not be allowed by the database system 206.

In this way, validating the database table structure as represented by the function modules in the data model 214 can be performed such that only valid identifiers can be presented to the user for selection. This can result in subsequent user requests 210 not representing any invalid identifiers.

This validation functionality can enable the data model 214 to be provided in a flexible way (such that a user can include function modules that access non-standard tables in the data model 214 if required, for example), while still providing some mitigation against invalid REST webservices being called by the processor 208.

Most ERP systems do not have an authorization setup on a table level. This is because the authorization is handled through processes and transactions. In order to address this, the user can access the ERP's authorization objects, which are stored in an authorization repository 224, such that they can be attached to the REST webservice 222. For example, they can be stored as part of the configuration data for the REST webservice. This means that the subsequent users of the REST webservice 222 need to have the authorization object as part of their authorization profile in order to access and execute the REST webservice. (As is known in the art, a REST webservice can also be referred to as a RESTful service.)

FIG. 2 illustrates an efficient and user-friendly system for calling one or more REST webservices 222. This can be because the first user does not need to know the data structure of the database—instead they can navigate to the fields in the database that they want to access using a REST webservice by interacting with the browser 200. This will be discussed in more detail below. Any direct interactions with the database 212 can be very difficult or impossible unless the user is an experienced developer. Therefore, the time required to call a REST webservice can be very significantly reduced. This is both in terms of: (i) the time required by the user; and also (ii) for the database system 206 to perform the necessary processing steps. This can include reducing or avoiding errors in calling the REST webservice, which can be due to the way that the processor 208 calls the REST webservice. For instance, the presentation of information to the user using the display 202 of the web browser 200 can be a lot easier and less prone to errors than known database tools, including known SAP tools.

In some examples, the tables within the database 212 may be standard tables, the structure of which may be specified by the database vendor. In other examples, the tables or complete views of tables in the database 212 may be non-standard tables that have been defined or customised by a particular user of the database 212. Such non-standard tables can therefore depart from the structure of standard tables. Use of the data model 214 and/or the repository 215 of pre-existing events advantageously provides a computationally convenient and efficient mechanism for allowing the first user to call a REST webservice 222 that can interact with both standard and non-standard tables. This is because the data model 214 and/or the repository 215 of pre-existing events can be used to access both standard and non-standard tables in the database table structure. Again, this enables the first user to call a REST webservice 222 for interacting with both standard and non-standard tables without having to access the actual database 212 to determine details of any non-standard tables.

The called REST webservice 222 can then be stored in a REST webservices storage block 230 of the database system 206. In this example, the called REST webservice is stored as: i) a framework REST webservice; and ii) configuration data that is based on the identifiers 219 of the selected pre-existing event and of the selected one or more actions. As will be discussed below, the configuration data for a required REST webservice can be used by the framework REST webservice when the REST webservice is called in order to provide the functionality of the REST webservice. The REST webservices storage block 230 may simply be computer memory associated with the database system 206. In some examples the REST webservices storage block 230 is part of an ICM (Internet Communication Manager), such that the REST webservices can be subsequently called from the ICM. A REST webservice can subsequently be run to interact with the database 212 to provide access to the relevant database information (either for a reading operation or a writing operation).

In other examples, an iterative process of querying the data model 214 with progressively more precise information from a series of queries 210 can be used to determine the selected identifiers 219 of function modules for calling the new REST webservice 222. In this way, each query 210 can provide part of the information required for the user to be able to determine the selected identifiers 219. In such an example, the data model 114 may receive a first query 210 in response to a first UI screen that is shown in the display 202 of the web browser 200. The first UI screen may provide high level details of the tables in the database 212, but not necessarily any fields within those tables. Therefore, the first query 210 may be a selection of one or more of the tables that are indicated on the first UI screen (but without them clicking a "generate" button). In response, the model 214 returns a first set of identifiers 218 of one or more tables, and fields within those tables, to the web browser 200. In response, the web browser 200 updates the display 202 such that it presents a second UI screen to the first user. In this example, the second UI screen is representative of one or more function modules associated those tables that are denoted by the first set of identifiers 218 (that were selected by the user using the first UI screen). The user can then provide a second query 210 in response to the second UI screen. Therefore, the second query 210 may be a selection of one or more of the fields that are indicated on the second UI screen. In response, the model 214 returns a second set of identifiers 218 of one or more function modules to the web browser 200. The user can then select which of the second set of identifiers 218 they wish to be included in the REST webservice, and then click a "generate" button". Clicking the "generate" button" causes the web browser 200 to send the selected identifiers 219 to the processor 208 such that it can call a REST webservice 222 based on the selected identifiers 219.

It will be appreciated, of course, that there can be any number of sequential user queries 210 before they click the "generate" button to cause the selected identifiers 219 to be sent to the database system 206.

It will be appreciated that such an iterative approach to receiving the user query 210 can advantageously provide a mechanism for the user to navigate through a database structure in order to identify tables and fields that are relevant to an intended purpose. Again, this can all be achieved without having to access the database 212, which can include vast amounts of data. Directly accessing the database 212 to extract the information that has been recognised as being relevant can be very slow.

In an example where the database system 206 is an SAP system, a query 210 can be generated in accordance with existing SAP credentials for the user. In this way, the user can only access data that they are authorized to access Optionally, the data model 214 can also store descriptive text associated with the function modules. The descriptive text can also be shown to the user on the display 202 of the web browser 200. Without such descriptive text, in some implementations the identifiers themselves may not be intuitively recognisable to the user.

FIG. 2 illustrates an improved way of calling a REST webservice that can subsequently be used to read database information from the database 212, or for writing database information into the database 212. The use of the data model 214 and/or the repository 215 of pre-existing events can be advantageous because it enables a user that does not necessarily have detailed technical database expertise to call REST webservices for accessing desired information, without writing bespoke computer code. Such a user is sometimes referred to as a citizen integrator/a business user. There is no need to write such bespoke code because the data model 214 and/or the repository 215 of pre-existing events enables identification of the location within the database 212 where the desired information is to be read (or written), and the processor 208 can automatically call the REST webservice based on the information returned by the data model 214 and/or the repository 215 of pre-existing events.

Figure 3:
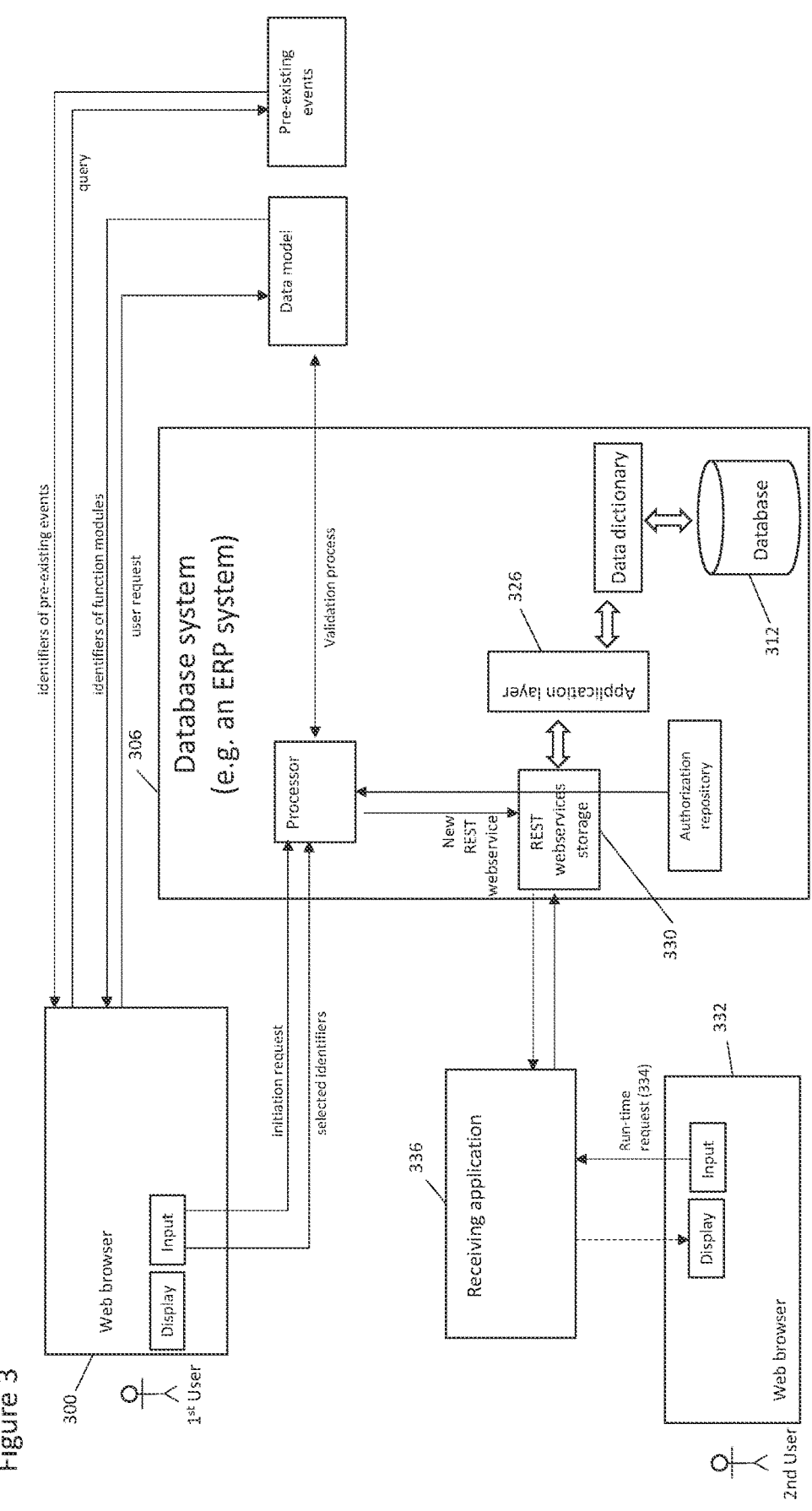
FIG. 3 shows an example of how the computing system of FIG. 2 can be used for accessing information in a database, by running a REST webservice that utilises configuration data that was generated by the processing that is described with reference to FIGS. 1 and 2.

FIG. 3 shows an example of how the computing system of FIG. 2 can be used for accessing information in a database 312, by running one or more REST webservices that were generated by the processing that is described with reference to FIGS. 1 and 2. Features of FIG. 3 that are also shown in FIG. 2 will be given corresponding reference numbers in the 300 series and will not necessarily be described again here.

In FIG. 3, a web browser 332 associated with a second user is shown as calling a REST webservice that is stored in the REST web storage block 330. It will be appreciated that the second user may or may not be the same person as the first user (associated with the first web browser 300).

The second user provides an instruction to an input region of the web browser 332 to select one or more REST webservices that are available in the REST webservices storage block 330. This causes a runtime request 334 to be sent to a receiving application 336. The runtime request 334 is initiated because the second user wishes to access database information in the database 312 that is associated with the selected one or more REST webservices.

The receiving application 336 can be an external application, an enterprise service bus (ESB), or a message broker as non-limiting examples. The receiving application 336 can also be considered as an integration platform and is optionally a cloud-based platform. Since the database information will be provided by the REST webservice in an open format, the receiving application 336 can be any standard computing system that does not require proprietary database-specific technology.

The receiving application 336 provides an instruction to the database system 306 such that the one or more selected REST webservices are run. In some of the implementations of the present disclosure, running a REST webservice involves integrating configuration data into a framework REST webservice to provide the functionality of the selected REST webservice. When the database system 306 runs the one or more REST webservices, the REST webservice accesses the database 312 via the application layer 326. The REST webservice then sends the relevant database information back to the receiving application 336.

Use of a REST webservice can advantageously ensure that the database information is provided in an open format, such that it can be accessible to any standard computer system, without requiring complex, database-specific, proprietary technology.

In other examples, the receiving application 336 may provide an instruction to the database system 306 to run one or more REST webservices automatically; that is, not necessarily in response to a user-initiated runtime request 334. For instance, the receiving application 336 may run one or more REST webservices periodically, or in response to one or more automatically generated triggers.

In some examples, the receiving application 336 can then send the relevant database information to one or more receiving systems, which may or may not include the second user's browser 332.

Figure 4:
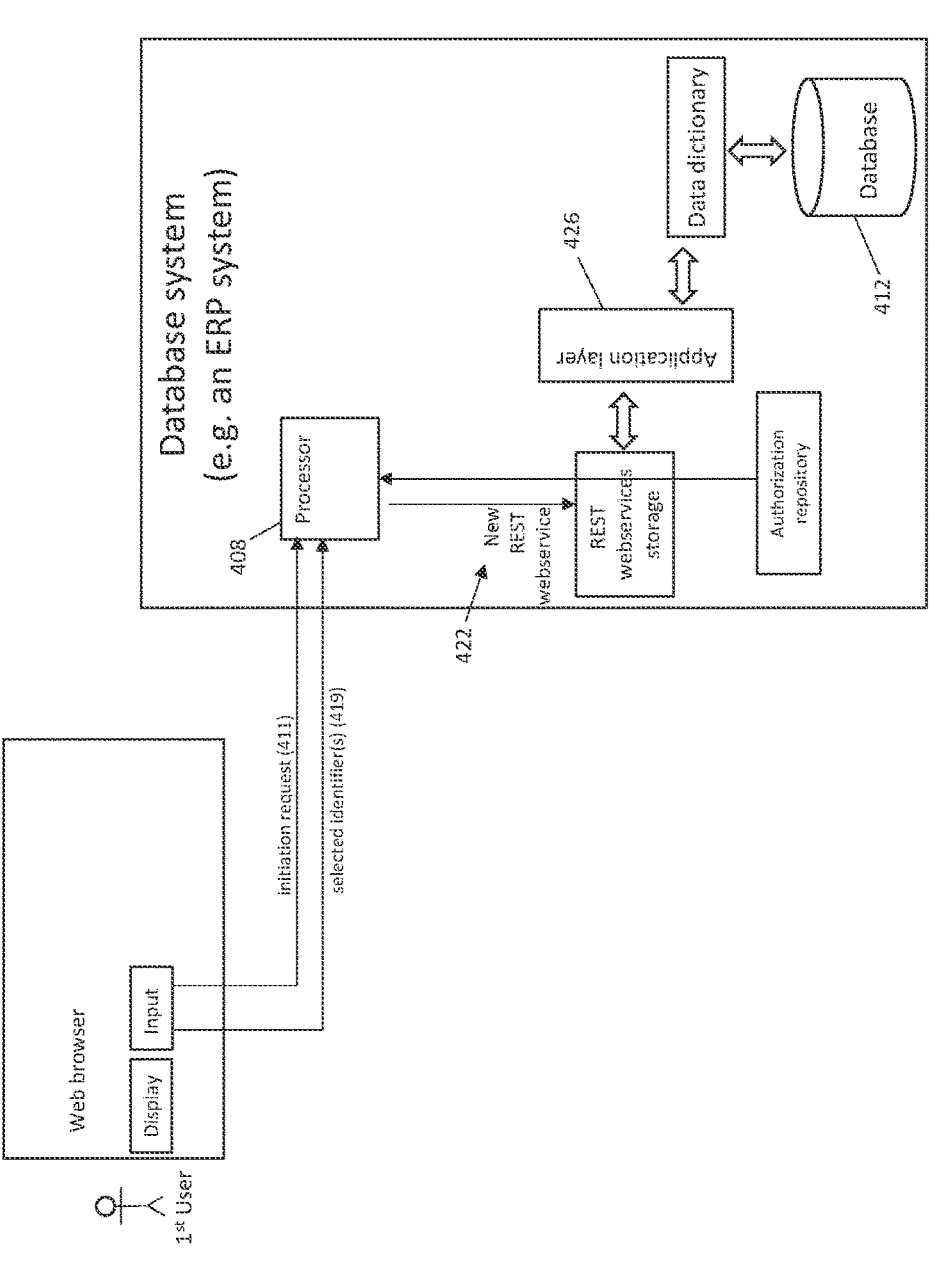
FIG. 4 shows another example of how the computing system of FIG. 2 can be used for generating configuration data for a REST webservice.

FIG. 4 shows another example of how the computing system of FIG. 2 can be used for enabling access to a database 412, via an application layer 426. Like features have been given like reference numerals in the 400 series and will not necessarily be discussed further here.

In this example, the processor 408 receives an initiation request 411 and one or more selected identifiers 419. Here, the one or more selected identifiers 419 are suitable for handling by the processor 408 for calling a REST webservice 422 without the need to query the data model 414 or the repository 415 of pre-existing events. For instance, this could be because the user is a developer that is familiar with the identifiers of the database structure, and therefore he or she does not need to use the data model 414 or the repository 415 of pre-existing to navigate through the database structure to find the identifiers that they are looking for. For this reason, the selected identifiers 419 will be referred to as one or more direct-identifiers. The direct-identifier can contain information that can directly identify desired database information.

Figure 5:
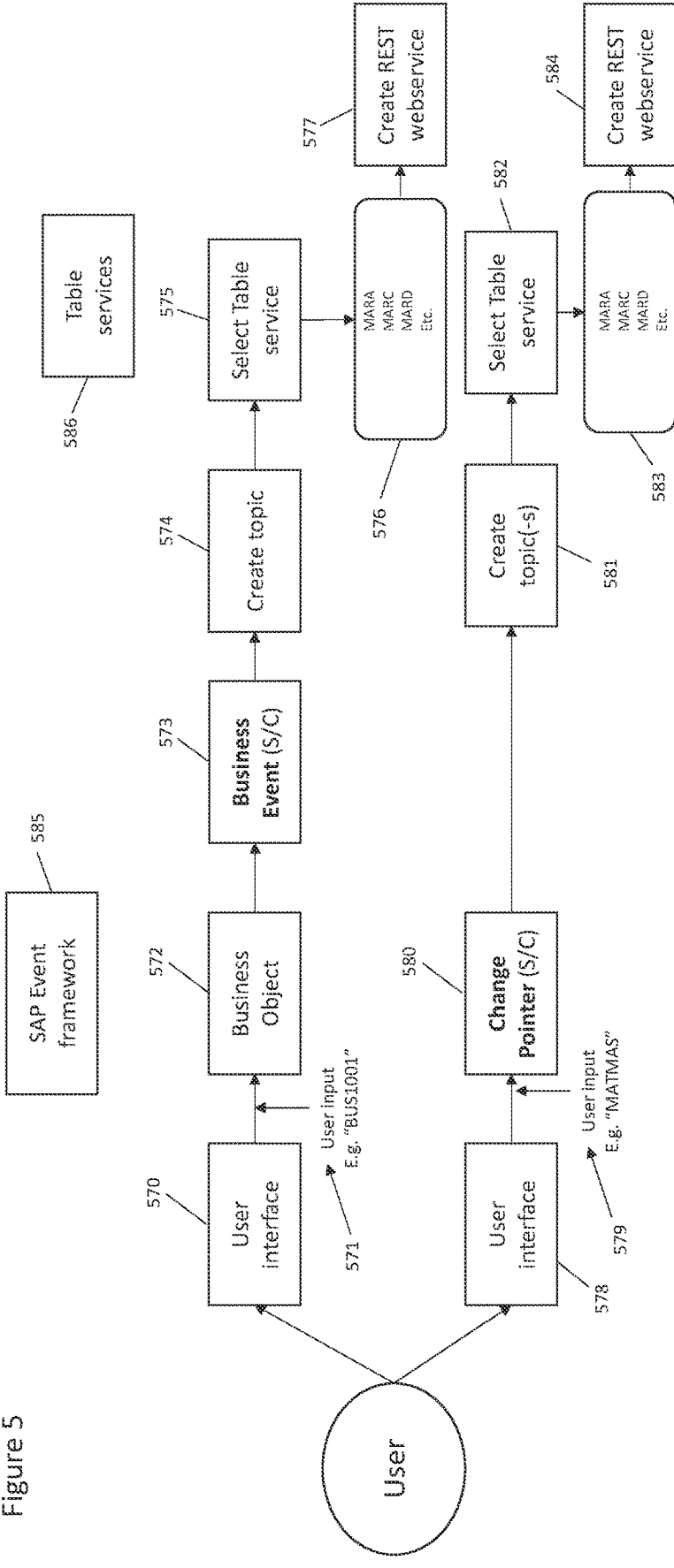
FIG. 5 shows schematically two different ways in which a user can generate configuration data for a REST webservice that includes an event using a system described herein.

FIG. 5 shows schematically two different ways in which a user can call a REST webservice that includes an event, using a system or method as described herein. A first way is illustrated by the upper branch of the figure, and is an example where the event is a business event in SAP. A second way is illustrated by the lower branch of the figure, and is an example where the event is a change pointer in SAP. The business events and the change pointers can be standard or custom (S/C).

Referring to the upper branch, a user interface 570 is displayed to a user. The user interface 570 in this example presents to the user a list of (pre-existing) business objects 572, wherein each of the business objects 572 is associated with one or more fields or tables in the database. A business object can be defined as a collection of data, methods or events for an entity in a business process. A business object can reduce the complexity of an ERP system by dividing it into small units. With the use of business objects, different components in the ERP system can communicate with each other. In this example, a user input 571 is provided to search for a business object that includes "BUS1001", as shown in FIG. 5. Such a search causes a subset of the available business objects to be presented to the user. The user can then select one of the business objects 572.

In response to selecting a business object 572, the user interface presents to the user a list of (pre-existing) business events 573 that are associated with the selected business object 572. The user can then select the business event that they wish to include in the REST webservice. The business objects 572 and the business events 573 are provided as part of a SAP event framework 585 in this example.

Providing the functionality for the user to select a business event 573 via an intermediate step of selecting a business object 572 can be advantageous because it provides a user-friendly way of the user identifying the business event that will provide the required functionality. This can provide an improvement to the way that the user can continue to interact with the computer to call the REST webservice.

In this example, the upper branch includes the optional processing step of creating a topic 574 that is associated with the selected business event. The topic can be considered as a label of the selected business event 573 such that it can be more readily selected by a user when creating a subsequent REST webservice. For example, the topics can be searched using wildcards such that a particularly agile event driven architecture can be provided.

The user also selects of one or more actions to be taken in response to the selected business event providing a trigger. In a SAP system, this can be considered as selecting a table service 575 from a repository 586 of available table services. Such table services provide identifiers for tables and/or fields in the database for which action may be taken. For example, a table service may identify tables/fields in the database that are read when the business event provides a trigger. An example of tables in the database that are associated with the selected table service are shown schematically in FIG. 5 with reference 576.

As discussed above, and as will be discussed below with reference to FIG. 7, a REST webservice 577 is then created using the selected business event 573 and the one or more selected actions/table services 575.

Referring now to the lower branch in FIG. 5, a user interface 578 is displayed to a user. The user interface 578 in this example presents to the user a list of (pre-existing) change pointers 580, wherein each of the change pointers 580 is associated with one or more fields or tables in the database. Change pointers can be considered as log entries to a log table, which are written every time a transaction modifies a specific group of fields across a specific group of tables in the database. As is known in SAP database systems, change pointers 580 can be triggered by create, update or delete activity in the database. An example of a user input that can be provided to search for a change pointer is "MATMAS", as shown in FIG. 5 with reference 579. Such a search causes a subset of the available change pointers to be presented to the user. The user can then select one of the change pointers 580. The change pointers 580 are also provided as part of the SAP event framework 585 in this example.

Also in this example, the lower branch includes the optional processing step of creating a topic 581 that is associated with the selected change pointer. The topic can be considered as a label of the selected change pointers 580 such that it can be more readily selected by a user when creating a subsequent REST webservice, in the same way that is described above for business events (with reference to block 574).

In the same way as the upper branch, the user also selects a table service 582 from a repository 586 of available table services. An example of tables in the database that are associated with the selected table service are shown schematically in FIG. 5 with reference 583.

Again, a REST webservice 584 is then created using the selected change pointer 580 and the one or more selected actions 582.

The business events and change pointers that are disclosed herein are 'PUSH' events in that they automatically provide a trigger. That is, a message containing the specified data will be sent out to the specified receiver for further processing, without requiring the specified receiver to pull the trigger from the event. When an event is triggered, the event ID is sent to a solutions queue either: in real-time (i.e. with a minimum delay); or periodically as part of a batch. The frequency of such batch processing can be a configurable parameter, and can be as frequent as once every second in some examples. For business events, the user may be able to specify whether the triggered event ID is transmitted in real-time or periodically. In SAP, change pointers are always processed as a batch process.

Figure 6:
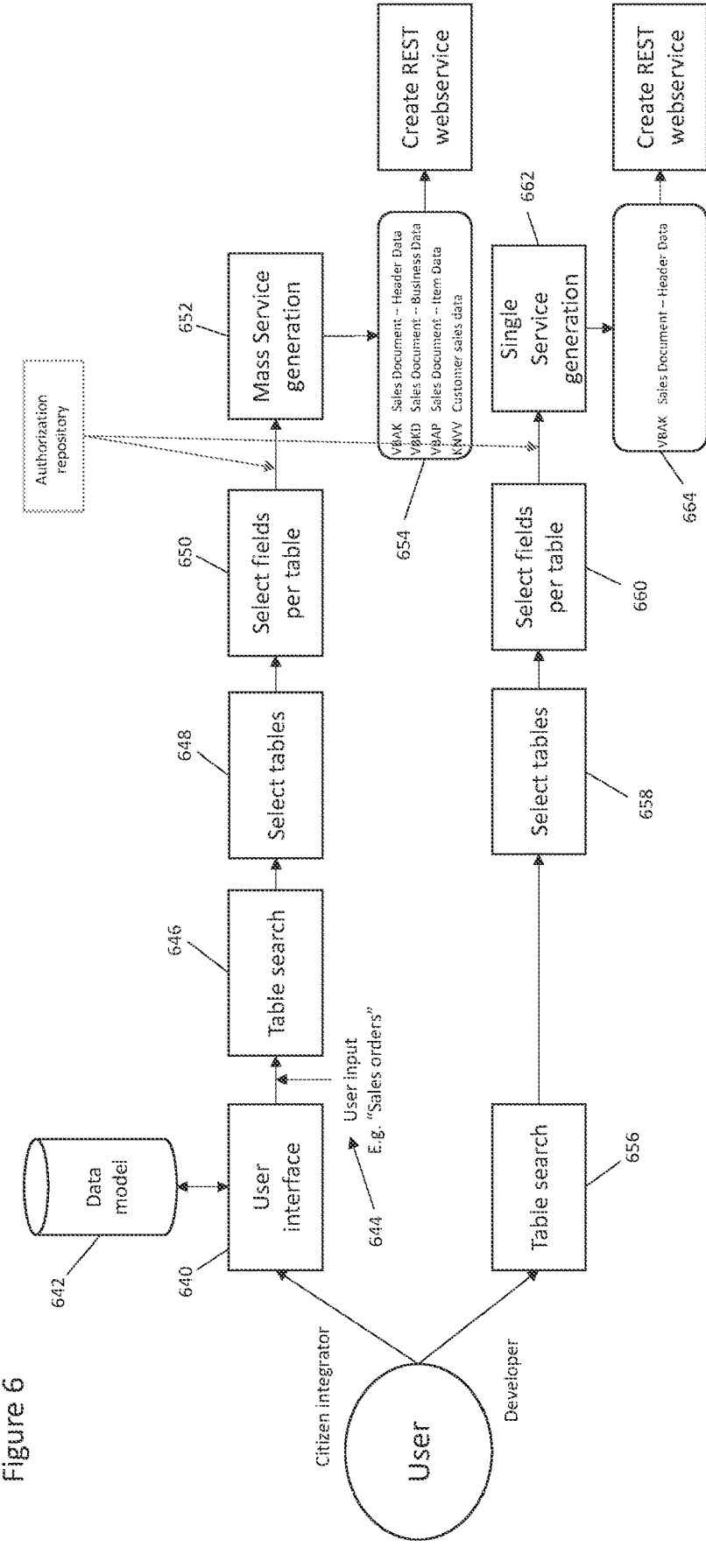
FIG. 6 shows schematically two further ways in which a user can generate configuration data for a REST webservice.

FIG. 6 shows schematically two different ways in which a user can call a REST webservice using a system described herein. A first way is illustrated by the upper branch of the figure; it utilises the function modules that are described above and can be suitable for a citizen integrator (for example a person who is not an experienced developer). A second way is illustrated by the lower branch of the figure, and can be suitable for a developer with good knowledge of the structure of the database for which they wish to generate a REST webservice.

Considering the citizen integrator user first (the upper branch in the drawing). The user interacts with a user interface 640 (such as a web browser as described with reference to FIG. 2), and provides an indication that they wish to call a REST webservice. This interaction causes the contents of a data model 642 to be validated, such that only valid identifiers of function modules can be presented to the user for selection. As discussed above with reference to FIG. 2, the data model 642 includes identifiers for a plurality of function modules. The user interface 640 then presents a display to the user that provides the functionality for the user to select one or more identifiers of the function modules. As shown in FIG. 6 with reference 644, a user provides user input. In this example, the user provides input as a text string, such that a user request is sent to the data model 642 so that it is searched for the text string: "Sales orders". In other examples, the user can initiate a user request by selecting one or more checkboxes that are associated with various aspects of the function modules that are stored in the data model 642.

In response to the user request that relates to "Sales orders", the system searches the data model 642 for function modules that are relevant to "Sales orders". This is represented as the "Table search" step 646 in FIG. 6. In this (heavily simplified) example, the data model 642 returns the following table identifiers, which are then displayed to the user:

| MVKE | Sales Org, distribution channel |
| MLAN | Sales data, tax indicator, tax |
| KNVV | Sales Area Data (terms, order probability) |
| VBAK | Sales Document - Header Data |
| VBKD | Sales Document - Business Data |
| VBAP | Sales Document - Item Data |
| VBEP | Sales Document Schedule line |
| KNVV | Customer sales data |

As can be seen, descriptive text (e.g. "Sales Org, distribution channel") can also be displayed with each table identifier (e.g. "MVKE").

At step 648, the user interacts with the user interface again and selects 4 of the tables that can be dragged to a canvas for further adoption—in this example by marking a checkbox associated with the desired tables. This is illustrated below with an X after the selected tables:

| MVKE | Sales Org, distribution channel |
| MLAN | Sales data, tax indicator, tax |
| KNVV | Sales Area Data (terms, order probability) |
| VBAK | Sales Document - Header Data X |
| VBKD | Sales Document - Business Data X |
| VBAP | Sales Document - Item Data X |
| VBEP | Sales Document Schedule Line |
| KNVV | Customer sales data X |

This causes the user interface to send a second user request to the data model 642 that is representative of the selected tables. In response to this second user request, the system searches the data model 642 for the identifiers of the fields in the tables that have been selected. In this (heavily simplified) example, the data model 642 returns the following field identifiers for the VBAK table (it will be appreciated that field identifiers will similarly be returned for the other selected tables):

| Field | Description | Datatype | Length |
|---|---|---|---|
| VBELN | Sales Document | CHAR | 10 |
| ERDAT | Date on Which Record Was Created | DATS | 8 |
| ERZET | Entry time | TIMS | 6 |
| ERNAM | Name of Person Created the Object | CHAR | 12 |
| ANGDT | Quotation/Inquiry is valid from | DATS | 8 |
| BNDDT | Date until quotation is binding | DATS | 8 |
| AUDAT | Document Date (Date Received/Sent) | DATS | 8 |

Again, descriptive text (e.g. "Client") can be displayed with each field identifier (e.g. "VBELN").

At step 650, the user interacts with the user interface again and selects 4 of the fields for this table. This is illustrated below with an X after the selected fields:

| Field | Description | Datatype | Length |
|---|---|---|---|
| VBELN | Sales Document X | CHAR | 10 |
| ERDAT | Date on Which Record Was Created | DATS | 8 |
| ERZET | Entry time X | TIMS | 6 |
| ERNAM | Name of Person Created the Object | CHAR | 12 |
| ANGDT | Quotation/Inquiry is valid from X | DATS | 8 |
| BNDDT | Date until quotation is binding X | DATS | 8 |
| AUDAT | Document Date (Date Received/Sent) | DATS | 8 |

After the user has selected the fields in this table (and fields in any other tables that they wish to be covered by the REST webservice), they can provide an input to the user interface to indicate that they are ready to call the REST webservice. This causes the user interface to instruct the database system to call the REST webservice based on the identifiers of the selected tables and fields. In this example, this can be considered as mass service generation 652 because more than one (in this example four—one for each of the tables selected) REST webservice is automatically called. The four REST webservices are illustrated schematically in FIG. 6 with reference 654. In other examples, a single REST webservice can be used to access data information in a plurality of tables.

The above description of the upper branch of FIG. 6 provides the user with the functionality to navigate to specific tables and fields in a database using the identifiers of function modules that are stored in the data model 642. In another use case, the user can select the identifier of a function module from the data model 642 and call the REST webservice based on the selected function module, without the user having to select specific tables and/or fields that are associated with the selected function module.

Now turning to the developer user (the lower branch in the drawing). The user can directly interact with a table search 656 to select tables 658 and fields 660. This time however, the system does not supply a user request to a data model because the user does not need to be guided through the database structure visually using the user interface. Instead, the system can simply call a REST webservice (here a single REST webservice) 662, which is illustrated schematically in FIG. 6 with reference 664.

Figure 7:
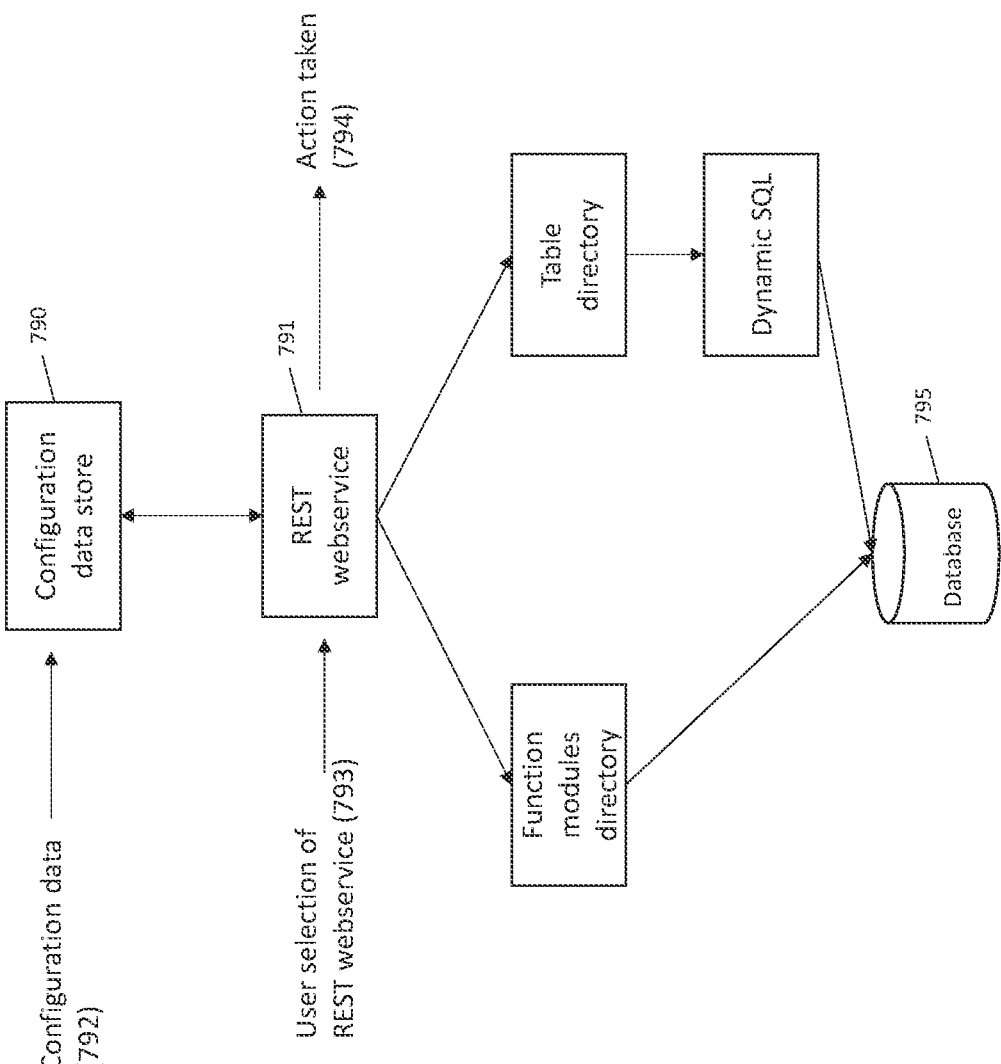
FIG. 7 shows schematically an example of how configuration data can be stored and used when a REST webservice is called.

FIG. 7 shows schematically an example of how configuration data for a REST webservice can be stored, and also how it can be used when a REST webservice is called.

FIG. 7 illustrates the principle that a REST webservice can be called by enabling a simple customizing table to be populated with configuration data that corresponds to each REST webservice. Such a customizing table is implemented in FIG. 7 as a configuration data store 790. The configuration data store 790 can receive configuration data 792 from any of the processing paths that are illustrated in FIG. 5 or FIG. 6. More particularly, the "create REST webservice" blocks in FIGS. 5 and 6 can generate the configuration data 792 that is stored in the configuration data store 790 of FIG. 7.

Once the configuration data 792 has been stored in the configuration data store 790, the associated REST webservice is then available to be called. In the example of FIG. 7, the user selection of a REST webservice is schematically identified with arrow 793. As discussed above with reference to FIG. 3, a user can call a REST webservice via a receiving application. In response to receiving a user selection 793 of a REST webservice, a REST webservice block 791 can retrieve configuration data that is associated with the selected REST webservice from the configuration data store 790. This exchange is shown schematically in FIG. 7 by the double-ended arrow between the configuration data store 790 and the REST webservice block 791.

The REST webservice block 791 can then integrate the configuration data into a framework REST webservice, which is accessible to the REST webservice block 791, such that the functionality of the selected REST webservice can be provided. As is known in the art, the REST webservice can access the database 795:

for function module services (as is described with reference to the upper branch in FIG. 6) a function module directory is utilised, and with the result exposes the REST webservice.

for table services (such as the ones that are described with reference to FIG. 7) a table directory is utilised and a dynamic SQL query is sent to the database 795, and with the result exposes the REST webservice.

When the REST webservice is called, it preforms the action 794 that was selected by the user when generating the REST webservice.

It will be appreciated that the type of configuration data that is stored in the configuration data store 790 will depend upon the type of REST webservice with which it is associated. For example, the configuration data can include data associated with table services, function modules, BW (Business Warehouse) extracts, or anything else that can be used to define the functionality of a REST webservice. Such configuration data can also be referred to as meta data. Advantageously, the configuration data store 790 can provide a single repository for configuration/meta data that can be combined with a framework REST webservice to provide the functionality of a requested REST webservice.

In this way, when a REST webservice is activated, the configuration data is looked up in the configuration data store 790 (which can also be known as a customizing table).

In order to call the REST webservice in SAP, a class implementing a standard SAP interface IF_HTTP_EXTENSION can be used as a handler for the service call. Appropriate handlers can be used for other systems. This can handle the logic or route the service call and data to class handling the logic. In one implementation, a class can be used that does not interfere or clash with existing classes, such that the call can be received and routed to the corresponding logic class—e.g. for table read, function modules execution etc..

Systems and methods of the present disclosure can be used to write database information to a database, as well as to read database information from a database. The location for writing database information into the database, in terms of tables and fields, can be defined in the same way as discussed above with reference to reading information by using identifiers. The processor can then configure an appropriate REST webservice to write the relevant database information via the application layer. In some examples, both read and write operations may be combined into a single REST webservice to perform a compound operation to control access to database information on a database. In this way, a REST webservices can be configured to: (i) read the database information via an application layer in communication with the database and provide the database information as an open format message; and/or (ii) write the database information to the database. In some examples, a REST webservice can be configured to write the database information to the database via the application layer.

Examples disclosed herein can receive a user request to interact with database information in a number of ways, including;

querying a data model based on the user request, wherein the data model is representative of a database table structure of a database containing the database information;

through various search functions directly accessing table structures;

through exposing functional transactions codes (business logic); and/or by accessing built-in monitoring tools for catching business (logical)/technical events.

The invention claimed is:

1. A computer-implemented method for calling a Representational State Transfer (REST) webservice for interacting with a database that stores database information, the method comprising, within an SAP database system in which the database resides:

presenting to a user a list of pre-existing events, wherein each of the pre-existing events provides a trigger in response to activity in the database, and wherein the list of pre-existing events comprises at least one change pointer that represents a modification of a specific group of fields in the database;

receiving a user selection of one of the presented pre-existing events;

receiving a user selection of one or more actions to be taken in response to the selected pre-existing event providing a trigger, wherein the one or more actions comprise an SAP table service or an SAP function module that performs an operation on the database;

storing the one or more selected actions within configuration data; and when the selected pre-existing event happens, integrating the stored configuration data into a framework of a REST webservice of the database system to produce a configured REST webservice that performs the operation on the database, and calling the configured REST webservice to perform the operation on the database.

2. The method of claim 1, wherein the list of pre-existing events comprises at least one business event.

3. The method of claim 1, wherein each of the pre-existing events automatically provide the trigger as a PUSH event.

4. The method of claim 1, wherein:

the step of presenting to the user the list of the pre-existing events is in response to a user-initiated search for pre-existing events based on one or more of: an identifier of the pre-existing event; a name of the pre-existing event; or a textual description of the pre-existing event.

5. The method of claim 1, wherein the method further comprises:

presenting to a user a list of pre-existing business objects, wherein each of the pre-existing business objects is associated with one or more fields or tables in the database; and receiving a user selection of a presented pre-existing business object, and in response presenting to the user a list of pre-existing business events that are associated with the selected pre-existing object such that the user can select one of the pre-existing business events as the selected pre-existing event.

6. The method of claim 1, wherein the method further comprises:

presenting to the user a list of actions, and in response: receiving the user selection of the one or more actions that can be taken in response to the selected pre-existing event.

7. The method of claim 1, wherein the method further comprises:

querying a data model, wherein the data model comprises a list of SAP function modules associated with the database, wherein each of the SAP function modules are for interacting with database information in one or more fields of the database;

returning, in response to the querying, identifiers of a plurality of SAP function modules;

presenting to the user a list of the returned SAP function modules; and receiving a user selection of one or more of the presented SAP function modules as the one or more actions.

8. The method of claim 7, wherein the step of presenting to the user the list of the returned SAP function modules is in response to a user-initiated search for function modules based on one or more of: an identifier of the SAP function module; a name of the SAP function module; or a textual description of the SAP function module.

9. The method of claim 7, wherein the data model is independent of the database information.

10. The method of claim 1, wherein the SAP database comprises an Enterprise Resource Planning database system.

11. A hardware processor for calling a Representational State Transfer (REST) webservice for interacting with a database that stores database information, the hardware processor configured to, within an SAP database system in which the database resides:

present to a user a list of pre-existing events, wherein each of the pre-existing events provides a trigger in response to activity in the database, and wherein the list of pre-existing events comprises at least one change pointer that represents a modification of a specific group of fields in the database;

receive a user selection of one of the presented pre-existing events;

receive a user selection of one or more actions to be taken in response to the selected pre-existing event providing a trigger, wherein the one or more actions comprise an SAP table service or an SAP function module that performs an operation on the database;

store the one or more selected actions within configuration data; and when the selected pre-existing event happens, integrate the stored configuration data into a framework of a REST webservice to produce a configured REST webservice that performs the operation on the database, and call the configured REST webservice to perform the operation on the database.

* * * * *